US010071684B2

United States Patent
Gascón Rivera et al.

(10) Patent No.: US 10,071,684 B2
(45) Date of Patent: Sep. 11, 2018

(54) LIGHT GUIDE ASSEMBLY

(71) Applicant: Continental Automotive Systems, Inc., Auburn Hills, MI (US)

(72) Inventors: Maria Cristina Gascón Rivera, Guadalajara (MX); Jesus Fernando Escalante Rosas, Zapopan (MX); Hiram Aburto Crespo, Tlajomulco (MX); Edgar Diaz-Sanchez, Guadalajara (MX)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/951,664

(22) Filed: Nov. 25, 2015

(65) Prior Publication Data

US 2017/0144593 A1    May 25, 2017

(51) Int. Cl.
*B60Q 3/64* (2017.01)
*B60Q 3/80* (2017.01)
*B60Q 3/283* (2017.01)

(52) U.S. Cl.
CPC ............. *B60Q 3/64* (2017.02); *B60Q 3/283* (2017.02); *B60Q 3/80* (2017.02)

(58) Field of Classification Search
CPC ....... B60Q 3/004; B60Q 3/024; B60Q 3/0293
See application file for complete search history.

(56) References Cited

U.S. PATENT DOCUMENTS

| 5,895,115 A * | 4/1999 | Parker ................. B60Q 1/0082 362/244 |
| 2010/0218641 A1* | 9/2010 | Neumann ............. B60K 35/00 74/552 |
| 2015/0375677 A1* | 12/2015 | Salter ................. H05B 37/0227 362/510 |
| 2016/0025281 A1* | 1/2016 | Gardner ................. F21V 29/70 362/516 |
| 2016/0089977 A1* | 3/2016 | Herrera-Morales ... B60K 35/00 701/36 |

* cited by examiner

*Primary Examiner* — Anabel Ton

(57) ABSTRACT

A vehicle display assembly includes a light source and a flexible light guide configured to emit light therefrom. The assembly may include a steering wheel assembly to which the flexible light guide is operably coupled. The vehicle display assembly may be configured to emit light in at least first, second, and third colors. For example, the vehicle display assembly may be configured to illuminate the flexible light guide in the first color in a first mode, in the second color in a second mode, and in the third color in a third mode.

20 Claims, 1 Drawing Sheet

LIGHT GUIDE ASSEMBLY

FIELD OF THE INVENTION

The present invention relates to vehicle display assemblies having one or more light sources and having a light guide that follows the contours of the assembly.

BACKGROUND OF THE INVENTION

Vehicle display assemblies typically display information on one or more display surfaces to the occupants of passenger and commercial vehicles. One such vehicle display is an instrument cluster having a speedometer and/or other instrumentation to display important information and values to the vehicle occupants. Conventional instrument cluster assemblies typically include a housing and a display surface. One or more light sources are typically mounted to illuminate the display surface within the housing. Generally, a lens is mounted toward the front of the housing between the vehicle's occupants and the illuminated display surface to protect the display surface and instruments. The light sources illuminate the display surface/instruments making the displayed information more visible to the vehicle occupants.

Tell tales may also be included, which are typically kept small because there is not much extra space in the area of the instrument clusters. Such tell tales may go unnoticed by a vehicle operator due to their small size and location amongst other clusters and other vehicle display information.

Other known instrument clusters use light emitting diodes (LEDs) mounted within the housing to illuminate cluster surfaces. Some vehicle display assemblies also have a rigid plastic component mounted in the housing to provide ornamentation. These conventional rigid components are disadvantageously formed of polycarbonate and polymethyl methacrylate. Generally to maximize an aesthetic effect, known rigid components are connected to the housing to allow the display of light transmitted by the LEDs through the rigid component. These components are undesirably rigid and cannot be used with other display geometries due to their rigidity. This undesirably decreases or eliminates the interchangeability of the rigid component for vehicle display assemblies having different geometries since each rigid component must be molded to accommodate a particular device's geometry.

SUMMARY OF THE INVENTION

The present invention is directed to vehicle display assemblies having at least one light source and at least one flexible light guide in a path of illumination to allow illumination of different predetermined shapes, contours, areas and/or surfaces. In some forms, the present invention includes one or more flexible light guides coupled to a steering wheel assembly, which allows them to be easily seen by the operator and differentiated from other vehicle data and instrumentation.

In one form, which may be combined with or separate from the other forms described herein, a vehicle display assembly is provided that includes a steering wheel assembly, at least one light source, and at least one flexible light guide operably coupled to the steering wheel assembly. The light guide is configured to emit light therefrom.

In another form, which may be combined with or separate from the other forms described herein, a vehicle display assembly is provided that includes at least one light source and at least one flexible light guide configured to be illuminated by the light source in at least first, second, and third colors. The light guide is configured to emit light therefrom. The vehicle display assembly is configured to illuminate the flexible light guide in the first color in a first mode, the vehicle display assembly is configured to illuminate the flexible light guide in the second color in a second mode, and the vehicle display assembly is configured to illuminate the flexible light guide in the third color in a third mode.

In yet another form, which may be combined with or separate from the other forms described herein, a vehicle display assembly is provided that includes a steering wheel assembly, at least one light source, and at least one silicon flexible light guide. The steering wheel assembly has a curved surface. The silicon flexible light guide (or guides) is operably coupled to the steering wheel assembly and positioned along the curved surface. The light source is configured to illuminate the flexible light guide in at least a first color, a second color, and a third color. The light guide is configured to emit light therefrom. The vehicle display assembly is configured to illuminate the flexible light guide in the first color in a first mode, the vehicle display assembly is configured to illuminate the flexible light guide in the second color in a second mode, and the vehicle display assembly is configured to illuminate the flexible light guide in the third color in a third mode.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Examples are reflected in the drawings, which will be described below. The drawings described herein are for illustration purposes only and are not intended to limit the scope of the present disclosure in any way.

DETAILED DESCRIPTION

The following description of the preferred embodiment(s) is merely exemplary in nature and is in no way intended to limit the invention, its application, or uses.

A vehicle display assembly is provided including at least one light source and at least one flexible light guide in a path of illumination to illuminate predetermined different shapes, contours, areas and/or surfaces of the vehicle display assembly.

Figure 1:
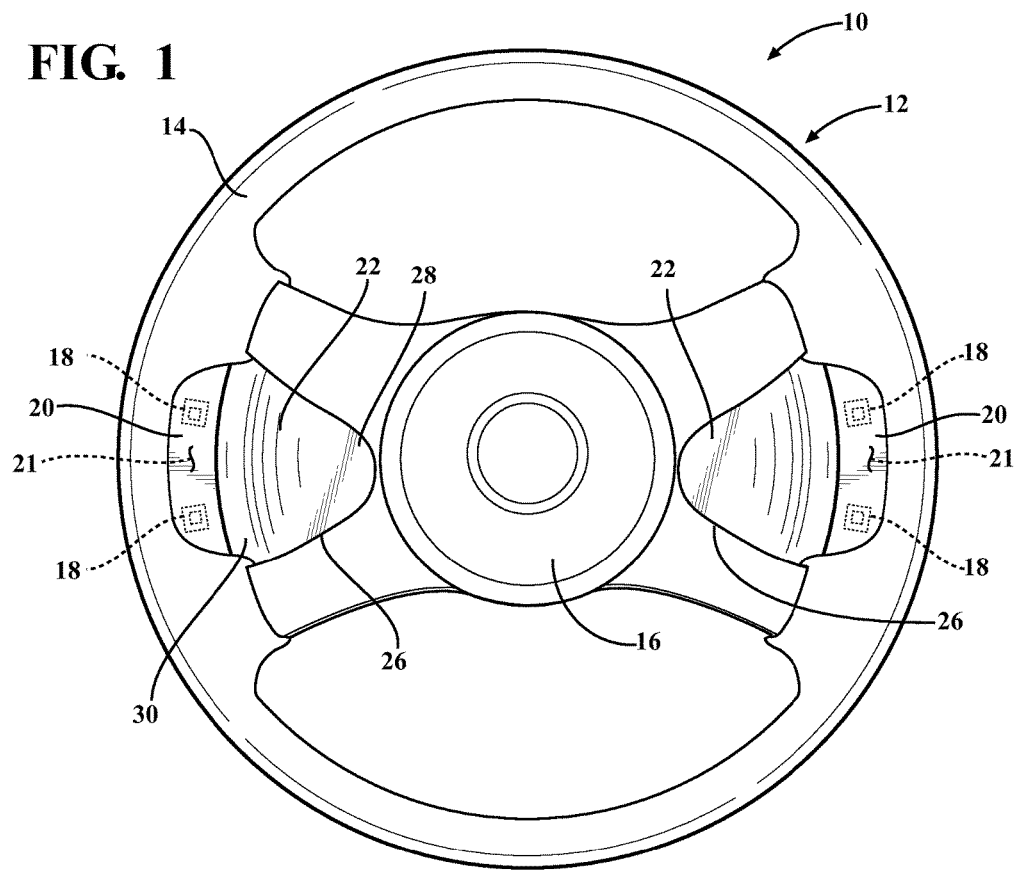
FIG. 1 is a front view of a vehicle display assembly including a steering wheel assembly, in accordance with the principles of the present disclosure.

Referring to FIG. 1, the vehicle display assembly is illustrated and generally designated at 10. In the illustrated example, the vehicle display assembly 10 is part of the steering wheel system of the vehicle. Thus, the vehicle display assembly 10 includes a steering wheel assembly 12. The steering wheel assembly 12 includes a steering wheel 14 and a central hub 16.

One or more light sources 18 (shown exploded from the assembly in FIG. 2) are hidden within any component of the steering wheel assembly 12, such as in a side housing 20 having a side pocket 21, the side housing 20 being connected to the steering wheel 14 and/or the central hub 16. The light sources 18 may be LEDs, by way of example. In FIG. 1, four light sources 18 are shown hidden in the side pockets 21 of two side housings 20 (with two light sources 18 in each side housing 20); however, any other suitable number of side housings 20 and/or light sources 18 may be used.

A least one flexible light guide 22 is operably coupled to the steering wheel assembly 12. For example, the flexible light guide 22 may be press fit to the central hub 16 adjacent to one of the side housings 20. In the illustrated example, two flexible light guides 22 are used, each light guide 22 being disposed adjacent to one of the side housings 20. The light guides 22 are configured to emit light therefrom, wherein the light originates with the light sources 18 disposed in the side pockets 21.

The flexible light guides 22 may be formed of silicon or other material suitable to provide flexibility to allow use in different vehicle display assembly shapes and to be a light conductor. For example, instead of silicon, the light guides 22 may be formed of optical fibers of another material, such as silica.

The flexible light guides 22 are operably connected to at least one surface of the steering wheel assembly 12 and operably sized and positioned relative to the light source or light sources 18 to illuminate the predetermined shapes, contours, areas and/or surfaces of the steering wheel assembly 12. In other words, the flexible light guides 22 can be disposed along a curve of the steering wheel assembly 12, and still be illuminated substantially throughout the surfaces of the flexible light guides 22.

Figure 2:
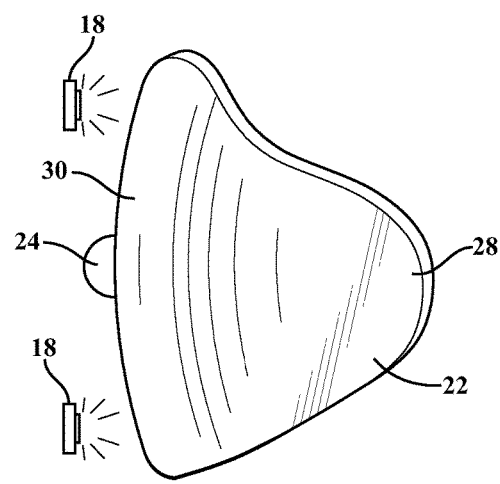
FIG. 2 is a schematic, exploded, perspective view of an exemplary flexible light guide partially twisted to illustrate flexibility of the flexible light guide and two light sources, in accordance with the principles of the present disclosure.

Referring to FIGS. 1-2 generally, and more particularly to FIG. 2, there is illustrated an exemplary flexible light guide 22. The flexible light guide 22 may optionally have an attachment portion 24 that may be slid within the side pocket 21 of the side housing 20, or another pocket or slit of the housing 20, to help secure the light guide 22 to the steering wheel assembly 12. In the alternative, the light guide 22 may attached to the steering wheel assembly 12 in another suitable manner, such as any other press fit, or by stapling or with the use of an adhesive such as glue, or with a fastener such as hook-and-grooves, screws, or nails, by way of example. However, fasteners that pierce the light guides 22 are not preferred because such piercing of the light guides 22 may interfere with the light pattern being conducted.

Fixation of the flexible light guide 22 depends on the application. In one embodiment the flexible light guide 22 is fixed by pressure to the particular vehicle display assembly 10, such that the flexible light guide 22 is pressed by and held in place between two or more rigid parts. For example, the flexible light guide 22 may be held at one end 28 to the central hub 16, and at another end 30 to the side housing 20. In the alternative, adhesive is used or in combination with the fixation of rigid parts to press the flexible light guide 22 and hold the guide 22 in place. Alternatively, the flexible light guide 22 may include a U-shaped cross section for attaching to an edge of the vehicle display assembly 10, e.g., to the edge of the housing 20.

In the illustrated embodiment, the flexible light guide 22 is shown having a generally smooth, triangular shape, which is shown partially bent along a curve in FIG. 2. The light guide 22 may thus be installed along a curved rigid surface 26 of the steering wheel assembly 12. In other words, the light guide 22 is positioned along the curved surface 26. Other cross-sections and shapes of the light guide 22 are contemplated such that the flexible light guide 22 may be used with various steering wheel assemblies having different geometries, or on different parts of the steering wheel assembly 12, or on another vehicle display assembly disconnected from the steering wheel assembly 12. Thus, the flexible light guide 22 described herein is implementable on any other application or dimensions for predetermined vehicle display assemblies that have different shapes, contours, areas and/or surfaces. This is a significant benefit over conventional rigid parts that are not interchangeable parts and cannot be used with other devices.

FIG. 2 exemplifies the flexibility of the flexible light guide 22 for bending, twisting and otherwise manipulating as needed to operably mount the flexible light guide 22 to a particular component of the vehicle display assembly 10, e.g., to follow the different shapes or contours, such as to the curved surface 26 of the steering wheel assembly 12. The flexible light guide 22 is a light conductor and the flexibility allows use in different applications. The light illuminates throughout the flexible light guides 22 and is viewable to the vehicle occupants, since at least one outer surface of the light guides 22 are exposed.

The thickness of each of the flexible light guides 22 is dependent on the light source(s) 18 used. By way of non-limiting example, the thickness may be at least 2.0 millimeters (mm); in some cases 2.0 to 10.0 mm; or in some cases, 2.0 to 5.0 mm.

The light guides 22 may optionally have additional features to assist with spreading light and/or improve aesthetics. For example, a light diffuser (not shown) may be disposed within the pockets 21 of the housings 20 adjacent the flexible light guides 22 to improve intake of light from the light sources 18. The diffusers may be formed of a material, e.g., polycarbonate, suitable to diffuse the light. In addition, the light guides 22 may have surface ornamentation, such as ribs or surface roughness.

The flexible light guides 22 are flexible to be easily manipulated to follow the different shapes of the different shaped curves 26 of the steering wheel assembly 12. The flexible light guides 22 conduct light and allow the illumination of different contours, shapes, areas and/or surfaces of the steering wheel assembly 12 or other vehicle parts.

Referring to FIG. 1, the light source 18 or light sources 18 may be operably mounted to at least one interior surface of the side housing 20, most preferably, on at least one interior side. Each flexible light guide 22 is connected a predetermined distance from the light source(s) 18 operably suited to illuminate the predetermined desired shape, contour, area and/or surface of the vehicle display assembly 10. The wall thickness and overall width of the flexible light guide 22 corresponds to the light source 18 used. Preferably, when a side mounted LED 18 is used, the flexible light guide 22 is closer to the LED 18 at a predetermined distance from the LED 18 suitable to illuminate the desired features.

In some variations, the light source 18 or light sources 18 are configured to illuminate the flexible light guide 22 in a plurality of different colors. For example, each light source 18 may comprise a RGB light emitting diode package configured to light the flexible light guide 22 in the plurality of different colors.

In some variations, the vehicle display assembly 10 is configured to illuminate the flexible light guide 22 in variety of colors. For example, the vehicle display assembly 10 may illuminate the light guide 22 in a first color in a first mode and in a second color in a second mode. Further, the vehicle display assembly could illuminate the light guide 22 in a third color in a third mode, and so on, by way of example.

In one variation, the vehicle display assembly 10 causes the LEDs 18 to illuminate the light guides 22 in red when the vehicle is in a sporty driving mode, in green when the vehicle is in an economy or ecologic driving mode, and in blue when the vehicle is in a city driving mode. Another color could be used for a comfort driving mode. The driver easily determines what mode the vehicle is in due to the color emanating from the steering wheel assembly 12, and the driver does not need to remember to look for the mode on a small tell tale mixed in with a variety of other information on the instrument cluster. In other variations, the lighting can be used for style or branding.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle display assembly, comprising:
    a steering wheel comprising a hub, a rim and a spoke coupled between the hub and the rim;
    at least one light source in the spoke; and
    at least one flexible light guide attached between the hub and the rim and disposed within a space between the hub, the rim and the spoke, the light guide configured to emit light from the at least one light source therefrom.

2. The vehicle display assembly of claim 1, the spoke has a curved surface, a portion of the flexible light guide being positioned along the curved surface of the spoke.

3. The vehicle display assembly of claim 2, wherein the at least one light source is configured to illuminate the flexible light guide in a plurality of different colors.

4. The vehicle display assembly of claim 3, wherein the vehicle display assembly is configured to illuminate the flexible light guide in a first color of the plurality of different colors in a first mode, and the vehicle display assembly is configured to illuminate the flexible light guide in a second color of the plurality of different colors in a second mode.

5. The vehicle display assembly of claim 4, wherein the at least one flexible light guide is comprised of silicon.

6. The vehicle display assembly of claim 5, wherein the at least one light source comprises a light emitting diode.

7. The vehicle display assembly of claim 6, wherein the at least one light source comprises a RGB light emitting diode package configured in to light the flexible light guide in the plurality of different colors.

8. The vehicle display assembly of claim 7, wherein the at least one light source comprises a plurality of light emitting diodes.

9. The vehicle display assembly of claim 8, wherein the at least one flexible light guide is press fit to the spoke.

10. The vehicle display assembly of claim 9, the vehicle display assembly being configured to illuminate the flexible light guide in a third color of the plurality of different colors in a third mode.

11. The vehicle display assembly of claim 4, wherein the flexible light guide is an optical fiber conductor.

12. A vehicle display assembly for a vehicle having a steering wheel with a spoke extending between a hub and a rim, the display assembly, comprising:
    at least one light source integrated into the spoke; and
    at least one flexible light guide disposed within a space between the hub, Rim and spoke, the flexible light guide configured to be illuminated by the light source in at least first, second, and third colors, the light guide configured to emit light from the at least one light source therefrom,
    wherein the vehicle display assembly is configured to illuminate the flexible light guide in the first color in a first mode, the vehicle display assembly being configured to illuminate the flexible light guide in the second color in a second mode, and the vehicle display assembly being configured to illuminate the flexible light guide in the third color in a third mode.

13. The vehicle display assembly of claim 12, the flexible light guide being positioned along a curved rigid surface of the spoke.

14. The vehicle display assembly of claim 13, wherein the at least one flexible light guide is comprised of silicon.

15. The vehicle display assembly of claim 14, wherein the at least one light source comprises a light emitting diode.

16. The vehicle display assembly of claim 15, wherein the at least one light source comprises a RGB light emitting diode package configured in to light the flexible light guide in the plurality of different colors.

17. The vehicle display assembly of claim 16, wherein the at least one light source comprises a plurality of light emitting diodes.

18. The vehicle display assembly of claim 13, wherein the flexible light guide is an optical fiber conductor.

19. The vehicle display as recited in claim 1, including at least one side housing mounted to the rim, the at least one side housing supporting the at least one light source and the at least one flexible light guide includes a portion disposed adjacent the at least one side housing.

20. The vehicle display as recited in claim 19, wherein the at least one flexible light guide comprises a planar shape with at least one side curved to correspond to a contour of the steering wheel.

* * * * *